(12) United States Patent
Purushothaman et al.

(10) Patent No.: US 9,729,552 B2
(45) Date of Patent: Aug. 8, 2017

(54) ACCESS VIOLATION MITIGATION SYSTEM

(71) Applicant: Bank of America Corporation, Charlotte, NC (US)

(72) Inventors: Sasidhar Purushothaman, Hyderabad (IN); Ravi Kumar Tadi, Hyderabad (IN); Subramanyam Mohanty, Gurgaon (IN); Swaminathan Natarajan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 77 days.

(21) Appl. No.: 14/968,998

(22) Filed: Dec. 15, 2015

(65) Prior Publication Data

US 2017/0171208 A1   Jun. 15, 2017

(51) Int. Cl.
  *G06F 7/04* (2006.01)
  *H04L 29/06* (2006.01)
(52) U.S. Cl.
  CPC ............ *H04L 63/10* (2013.01); *H04L 63/107* (2013.01)
(58) Field of Classification Search
  CPC ............................. H04L 63/10; H04L 63/107
  See application file for complete search history.

(56) References Cited

U.S. PATENT DOCUMENTS

| | | | |
|---|---|---|---|
| 7,350,226 B2 | 3/2008 | Moriconi et al. | |
| 7,376,838 B2 | 5/2008 | Narayanan | |
| 8,388,440 B2 | 3/2013 | Patterson | |
| 8,631,477 B2 | 1/2014 | Chen et al. | |
| 8,862,551 B2 | 10/2014 | Lim | |
| 8,868,607 B2 | 10/2014 | Apsel | |
| 2004/0139197 A1* | 7/2004 | Blumenschein | G06F 17/30386 709/225 |
| 2007/0156695 A1* | 7/2007 | Lim | G06F 21/6218 |
| 2013/0239177 A1* | 9/2013 | Sigurdson | H04L 63/102 726/4 |

* cited by examiner

*Primary Examiner* — Mohammed Waliullah
(74) *Attorney, Agent, or Firm* — Weiss & Arons LLP; Michael A. Springs, Esq.

(57) ABSTRACT

Apparatus and methods for enhancing system security are provided. The apparatus may include an article of manufacture comprising a computer usable medium having computer readable program code embodied therein for receiving a request from a user to access a system, the request including user-identifying information. The apparatus may also include computer readable program code for accessing a database and identifying one or more user groups associated with at least a portion of the user-identifying data in the database. The apparatus may further include computer readable program code for identifying one or more security groups associated with each of the one or more user groups. The apparatus may additionally include computer readable program code for retrieving access permissions associated with each of the identified one or more security groups. The apparatus may also include computer readable program code for granting the user access to the system.

9 Claims, 5 Drawing Sheets

ACCESS VIOLATION MITIGATION SYSTEM

FIELD OF TECHNOLOGY

Aspects of the disclosure relate to providing apparatus and methods for enhancing computer security. In particular, the disclosure relates to apparatus and methods for enhancing computer security by creating and implementing rule-based access privileges.

BACKGROUND

System managers are challenged with establishing and maintaining the security of their systems. Security threats include an outsider accessing the system without permission. Security threats also include an insider abusing his access privileges. Therefore, ensuring that access privileges for Information Technology ("IT") personnel is limited to the access necessary for his job description is vital to maintaining system security.

In small businesses, system managers can review user permissions and actions with manual editing. For large business, a manual edit quickly becomes impractical.

For example, a manager of a large business may oversee operation of 60,000 servers and access permissions of the IT personnel to each of the 60,000 servers. Access granted to each IT personnel includes access to both the servers that she can access and the component(s) on each of the servers that she is granted access to. Thousands of rules are involved in the access permissions of the IT personnel, making review and enforcement of these rules an overwhelming job for system managers.

Furthermore, many system managers are unaware of permissions granted to IT personnel from different teams or system managers. For example, a certain IT personnel may be granted time-limited access to a server for completion of a time-constrained task. The IT personnel's system manager may be unaware of the time-sensitive nature of the IT personnel's access, and thus may not be aware of a security violation in the event that the IT personnel fails to timely drop his additional system access. Additionally, IT personnel moving between teams may inadvertently retain their old access from their previous team in addition to receiving their new access privileges. This results in a security violation, with the system manager being unaware that the old access privileges have not been revoked.

It would be desirable, therefore, to provide apparatus and methods for defining user permissions using a preferably transparent interface which provides system managers with the ability to create and review all access granted to their IT personnel.

It would also be desirable to enforce the defined user permissions across all systems and servers, thus assisting the system managers in maintaining the security of their systems.

SUMMARY OF THE DISCLOSURE

Systems and methods are provided for enhancing computer security. The method may include storing in a database a first group of users associated with a first user group and a second group of users associated with a second group. The method may also include storing in the database a first security group and a second security group. The method may further include storing a plurality of first permissions associated with the first security group and a plurality of second permissions associated with the second security group. The first permissions may include authorized access to a physical level of a first server. The second permissions may include authorized access to an application layer of a second server.

The method may also include storing in the database a first set of data associating the first group of users with the first security group and a second set of data associating the second group of users with the second security group.

The method may additionally include storing in the database a first set of traversing rules associated with the first security group and a second set of traversing rules associated with the second security group. The method may further include continuously (or periodically) comparing commands executed by of each of the users included in the first group of users to the first set of traversing rules, and continuously (or periodically) comparing commands executed by each of the users included in the second group of users to the second set of traversing rules.

The method may also include generating an electronic notification in response to identifying a command executed by a first user included in the first group of users that is not included in the first set of traversing rules. In some embodiments, the method may additionally include suspending the first user's access to the physical layer of the first server if a response to the notification is not received within a predetermined length of time.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Apparatus and methods for enhancing computer security are provided. Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
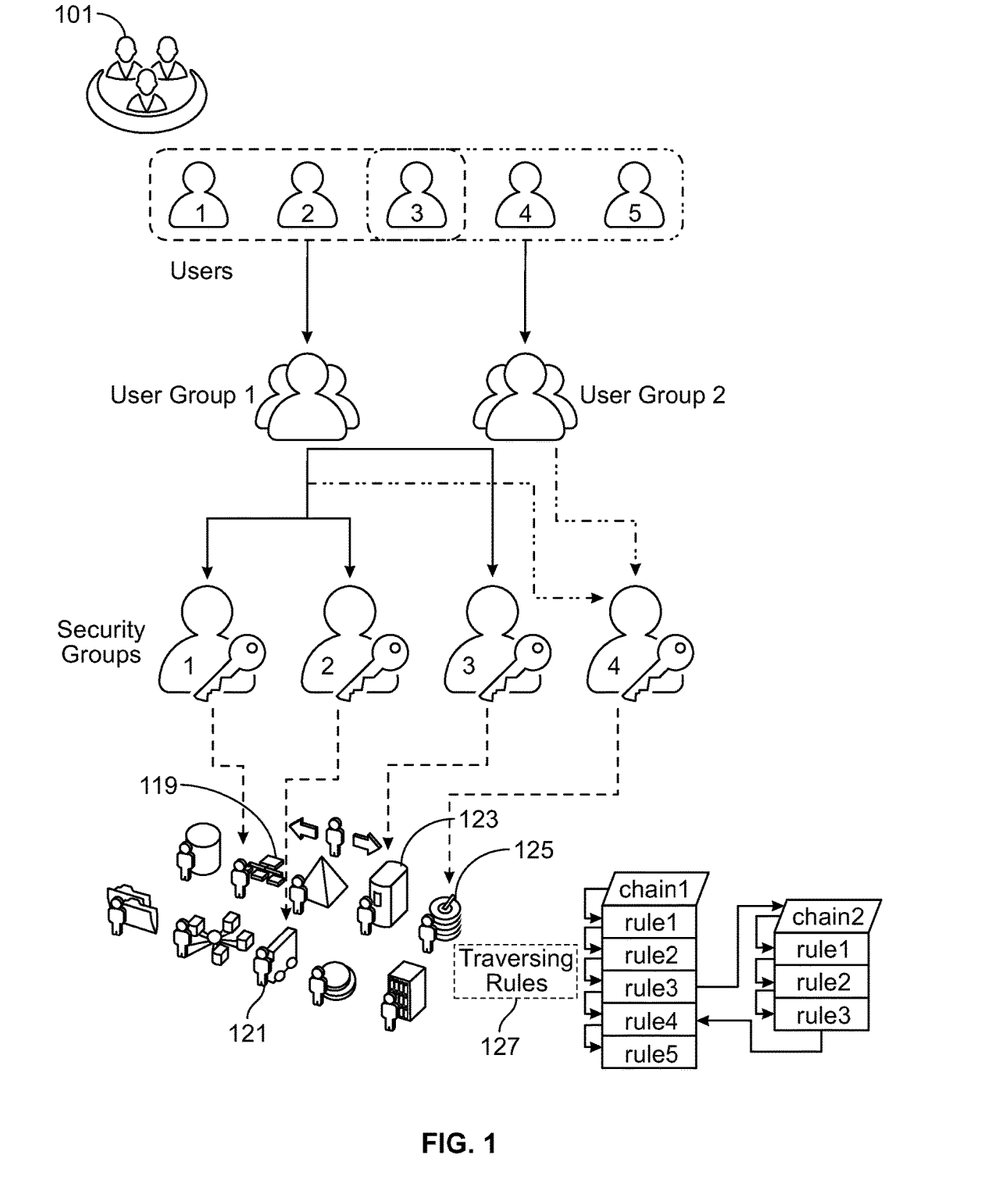
FIG. 1 shows a process and apparatus in accordance with the invention.

FIG. 1 illustrates an exemplary process and apparatus that may be used in accordance with the systems and methods of the invention.

At least a portion of the exemplary process illustrated in FIG. 1 may be executed by a user using a graphical user interface ("GUI") in accordance with the invention. The GUI may function to support one or more of the novel processes, systems, apparatus and methods described herein. For example, commands, selections, transactions, and other information input by a user into the GUI may initiate one or more of the novel processes, systems, apparatus and methods described herein.

One or more transmitters, processors, receivers, and any other suitable hardware and software may be used to implement the functionalities of the GUI described herein. Any suitable programming formats may be used to support the GUI's functionalities. For example, Java© may be used to program the GUI, and shell scripting and Python© may be used to program back-end GUI functionalities.

One or more managers 101 may be granted authorized access to the GUI. Each of managers 101 may have one or more permissions associated with their access to the GUI. Exemplary permissions include read-only, view and edit.

It should be noted that any suitable business employee may be granted access to the GUI, such as IT personnel, engineers, system managers, executives, or any other suitable employee. For the purposes of the application, an employee with access to the GUI may be referred to alternately herein as a 'manager.'

Manager 101 may use the GUI to define one or more user groups. Each user group may be associated with one or more users. A first user group may be associated with a first plurality of users. A second user group may be associated with a second plurality of users.

Each user may be identified by a user identification number, user name, or any other suitable identifying data. In some embodiments, a first user group may include one or more users that are also included in a second user group. In some embodiments, a user may be included in only one user group.

In some embodiments, a manager 101 of the GUI may have permission to create user groups including a defined set of users. For example, a large business may include many system managers. Each system manager may oversee the work of a subset of employees employed in the large business. In some of these embodiments, a system manager accessing the GUI may have authorization to define and create user groups for those employees (or "users") that the system manager is tasked with overseeing. The system manager may or may not have read-only access to the user groups (and associated security groups) of other employees of the large business.

FIG. 1 shows managers 101 defining user group 1 and user group 2. Manager 101 may use the GUI to associate users 1, 2 and 3 with user group 1. Manager 101 may use the GUI to associate users 3, 4 and 5 with user group 2.

Manager 101 may also use the GUI to define one or more security groups. For example, manager 101 may define one or more security groups by using the GUI to associate each security group may with a defined type of authorized access. For example, the authorized access may be authorized access to one or more types of hardware, software, and/or firmware, such as firewalls, applications, networks, databases, and/or servers. The authorized access may be limited to one or more aspects of the firewall, application, network, etc. described above. Exemplary aspects include one or more of the seven layers defined by the Open Systems Interconnection model (OSI model), which defines the physical layer, data link layer, network layer, transport layer, session layer, presentation layer and the application layer.

In some embodiments, the authorized access may include authorized access to one or more user groups and/or authorization to manage one or more security groups.

In some embodiments, automated scripting may be used to interact with the GUI and define and assign security permissions to one or more security groups.

The authorized access may be input by manager 101 into one or more fields displayed in the GUI. The authorized access may be selected by manager 101 from displayed options or drop-down menus included in the GUI.

In FIG. 1, manager 101 has also used the GUI to define security group 1, security group 2, security group 3 and security group 4. Security group 1 may be associated with authorized access to network 119, security group 2 may be associated with authorized access to firewall 121, security group 3 may be associated with authorized access to database 123 and security group 4 may be associated with authorized access to server 125.

Manager 101 may further use the GUI to associate each user group with one or more security groups. Association of a user group with a security group may result in granting permission to the users in the user group for accessing the hardware, software or firmware associated with the one or more security groups.

In FIG. 1, manager 101 has associated user group 1 with security groups 1, 2, 3 and 4. This may result in granting users 1, 2 and 3 authorized permissions to access network 119, firewall 121, database 123 and server 125. In FIG. 1, manager 101 has associated user group 2 with security group 4. This may result in granting users 3, 4 and 5 authorized permissions to access server 125.

The GUI may create one or more reports. The reports may be generated periodically or in response to a user command. A portion of the report may include a pictorial representation of one or more users, user groups, security groups, and their interrelationship. In some of these embodiments, the users may be associated with user-identifying information such as a name or a user identification number. This pictorial representation may be used by high-level business employees such as executives, managers, and other key stake holders to quickly and easily review access permissions granted to a plurality of employees in an easily understood diagram. For example, a manager may instruct the GUI to create a report illustrating the users, user groups and security groups associated with his team members. This may afford the manager a quick way for reviewing his team's access permissions.

In some embodiments, a manager may create a user group for each team that he is managing. The manager may then associate each user group with one or more security groups. The one or more security groups may give the user group the access that the team needs to perform their assigned tasks.

In some embodiments, an employee may be included in two or more user groups. In FIG. 1, user 3 has been included in both security group 1 and security group 2.

In some embodiments, including a user in two or more user groups may have inherent risks, such as the user inadvertently being granted too much access to the electronic systems of the business. In some embodiments, a manager 101 may input into the GUI overriding rules. The overriding rules may limit the scope of authorized access that can be granted to a user using the invention. For example, an overriding rule implemented in the GUI may be that a user included in a user group cannot be granted access to both the application layer and the network layer of a server.

The GUI may operate to enforce the overriding rules. For example, when a new user group is created, the GUI may run a query to identify any users in the new user group that are included in a different user group. For each user included in the new user group and one or more additional user groups, the GUI may pull all the access granted to each user from all the user groups. The GUI may then compare the user's full access to the overriding rules. If the user's access violates one or more overriding rule, the GUI may display one or more alerts to manager 101. The GUI may create a new user group only when it has been determined that the user permissions granted by the new user group do not violate any of the overriding rules.

In some embodiments, the GUI may periodically create a report for transmission to one or more system managers. The report may identify all users included in two or more user groups. In some embodiments, each system manager may receive a customized report that includes only users that are supervised by the system manager. The report may list all of the authorized access given to each of these users. This report may also flag user access granted to a user that has been defined as high risk access by one or more managers 101. In some embodiments, the report may identify any attempts by a manager 101 to create a user group that gives permission to a user in the user group which violate one or more overriding rules.

One or more managers 101 of the GUI may use the GUI to define traversing rules. In some embodiments, a manager 101 may use the GUI to define traversing rules only if the manager 101's access permissions include the authority to define traversing rules. In FIG. 1, traversing rules 127 have been created by one or more managers 101.

Traversing rules may define a plurality of user transactions. A user transaction may be any command or sequence of commands executed by a user using a computer, cell phone, smart phone, pager, tablet, laptop, or any other electronic device.

The traversing rules may define privileged transactions that a user or group of users is allowed to perform in an application, firewall, database, server or network, based on their permissions within the system. For example, a traversing rule may be a set of actions that one or more users or user groups are allowed to perform based on their team roles in the business.

In some embodiments, the user transactions may be user transactions that a manager 101 has determined to be allowable for one or more user groups. In some embodiments, the user transactions may be user transactions that a manager 101 has determined to be allowable for one or more security groups, and for each user group associated with the one or more security groups. In some embodiments, the traversing rules may be different for each user group or security group. In some embodiments, the traversing rules may be the same for each user group or security group.

Exemplary traversing rules may include logging into a server, checking the logs, restarting services and components, changing configurations, bouncing services and/or bouncing executable components.

The user groups, users included in each user group, security groups, security groups associated with each user groups, and traversing rules may be stored in a centralized authorization database ("CAD"). The CAD may be in electronic communication with the GUI. The CAD may store at least a portion of the data selected and input into the GUI. For example, the CAD may store data relating to the users, user groups, security groups and traversing rules input into the GUI and modified by a user via the GUI.

The CAD may define a 'set point.' For the purposes of this application, the set point may define the authorized access permission for all the users stored in the CAD. In some embodiments, the CAD may define the authorized access permission for some or all business employees.

The systems and methods of the invention may include a centralized monitoring tool ("CMT"). The CMT may be in electronic communication with the CAD. The CMT may use one or more processors, receivers, transmitters, and any other suitable hardware or software to enforce the scope of authorized access defined by the set point. The CMT may monitor user transactions on one or more applications, servers, databases, firewalls and networks to identify any deviations from the set point. For the purposes of this application, a deviation from the set point may be referred to alternately herein as a "violation."

The monitoring may be implemented for one or more users of the applications, servers, databases, firewalls and networks. In some embodiments, the monitoring may be implemented for every user of the applications, servers, databases, firewalls and networks. For example, a large business may include a plurality of the applications, servers, databases, firewalls and networks. The CMT may monitor user transactions on some or all of the large business's applications, servers, databases, firewalls and networks In exemplary embodiments, a user may access the electronic system of a large business using a user password. The password may be associated with the user in a database. The CMT may query the database to identify the user associated with the password. The CMT may then transmit a query to the CAD requesting all authorized permissions granted to the user by one or more managers 101. Alternatively, the CMT may pull from the CAD all authorized permissions granted to the user by one or more managers 101. In some embodiments, the authorized permissions may include the security groups that the user has been granted access to as a result of his inclusion in one or more user groups. The authorized permissions may also include the traversing rules associated, in the CMT, with the user's user group(s) and/or security group(s) associated with the user's user group(s).

The CMT may then monitor all of the user's transactions. The monitoring may be continuous. The monitoring may be periodic. The CMT may monitor the user's transactions for conformance with the authorization permissions granted to the user by the CMT. For example, the CMT may monitor the user's transactions to ensure that the user does not access any electronic system to which the access is unauthorized. If the CMT identifies user transactions attempting to gain access to an electronic system to which the user is not authorized, the CMT may categorize the user transaction as a violation.

In some embodiments, if the CMT identifies user transactions attempting to gain access to an unauthorized system, the CMT may enforce denial access in real-time. The CMT may store violation data in the CAD. The CMT may transmit the violation data to one or more predetermined addresses substantially immediately after the violation. The CMT may additionally, or alternatively, include the violation data in a report generated hourly, daily, bi-weekly, weekly, or monthly, for one or more managers 101.

The CMT may also monitor the user's transactions for conformance with the traversing rules. The monitoring may be continuous. The monitoring may be periodic. In some embodiments, the CMT may store, temporarily, for a predetermined period of time, or permanently, the user's transactions. The CMT may purge the user's transactions upon the lapse of a predetermined period of time. The CMT may purge the user's transactions upon the lapse of a predetermined time period only if the CMT has not identified any user violations during that time period.

In some embodiments, the CMT may monitor a user's transactions to ensure that the user does not execute any user transactions that are not included in the traversing rules associated with: (1) the user's user group(s); and/or (2) security group(s) associated with the user's user group(s). If the CMT identifies user transactions that are not included in the user's traversing rules, the CMT may categorize the user transactions as a violation. The CMT may access the user's traversing rules by requesting the traversing rules from the CAD or by pulling the traversing rules from the CAD.

In some embodiments, a user transaction that is not included in the user's traversing rules may be a user action, or a sequence of user actions, that has been identified as a high risk by one or more managers 101. Exemplary high risk transactions may include unauthorized and/or malicious transactions. Actions that are identified as high risk transactions for a user may be based at least in part on the user's roles and tasks within the business. An exemplary user transaction that may not be included in a user's traversing rules may include executing an activity and subsequently attempting to delete the activity from both the activity log and the server.

Exemplary user transactions that are not included in a user's traversing rules and/or that may be identified as high risk transactions may include attempting to access and tamper with a root partition, accessing a log and deleting the log, attempting to view data within a database, attempting to alter permissions of users, user groups and/or security groups, attempting to open a new port, establishing unwarranted connectivity in one or more firewalls and/or attempting to modify a system configuration file and erasing the traces of the modification activity.

In the event that the CMT categorizes one or more user transactions as a user violation, the CMT may initiate one or more forms of remedial action in response to categorizing a user transaction as a violation. A user transaction that has been categorized by the CMT has a violation may be referred to alternately herein as a high risk transaction.

In some embodiments, after the identification of a high risk transaction, the CMT may substantially immediately deny any action that the user was attempting to complete when executing the high risk transaction.

In some embodiments, after the identification of a high risk transaction, the CMT may transmit an electronic notification to one or more managers 101 detailing the high risk transaction. The electronic notification may include data identifying the user and the nature of the high risk transaction.

In some embodiments, the CMT may wait for one of managers 101 to initiate remedial action in response to the electronic notification. In the event that no remedial action is initiated by a manager 101 after the lapse of a predetermined time period, the CMT may initiate remedial action in the absence of a manager's response. For example, if the manager does not respond within a predetermined time period such as a day, week, two weeks, or a month, the CMT may withdraw some or all permissions granted to the user until the manager overrides the CMT's actions.

The predetermined time period may be the same for each manager 101. In some embodiments, the predetermined time period may be based on a number of employees supervised by the manager. For example, a manager who supervises 1-100 employees may be given a short time period, a manager who supervises 101-500 employees may be given a second, longer time period, and a manager who supervises 501-plus employees may be given a time period longer than the other time periods.

In some embodiments, the predetermined time period may vary depending on the manager's geographical location. For example, the manager may be given at least one full business day prior to the CMT-initiated remedial action.

In some embodiments, the predetermined response time may be based at least in part on a historical response time associated with the manager.

In some embodiments, the nature of the remediation initiated by the CMT, and the timing associated with the remediation, may be defined in the CAD. For example, in the event that CMT identifies a high risk transaction, the CMT may search one or more databases included in the CAD for one or more forms of appropriate remedial action to be taken.

The CMT may execute the aforementioned user monitoring for some of the users accessing the system. The CMT may execute the user monitoring for each user accessing the system. For example, in a large business, the CTM may be used by the business to monitor all the users accessing the business's system. This electronic monitoring may enable the large business to enforce the set point defined by business executives and managers on all user transactions in real time, and to provide continuous verification of compliance. Furthermore, the set-point defined in the CAD creates transparency within the business by creating a centralized database for storing the access permission of all business employees, and enables key stake holders to review and enforce access to specific resources on a regular basis.

Figure 2:
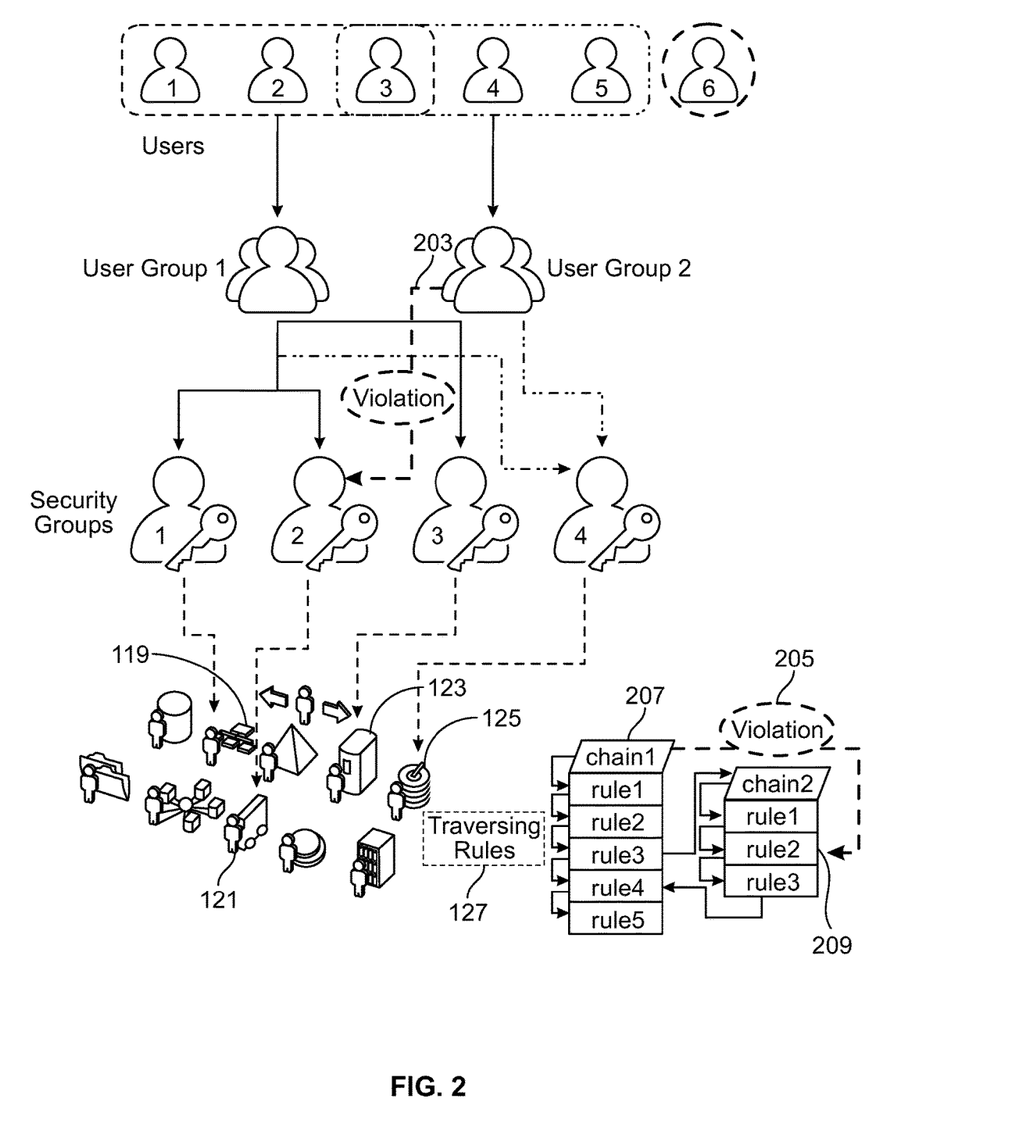
FIG. 2 shows another process and apparatus in accordance with the invention.

FIG. 2 illustrates another exemplary process and apparatus that may be used in accordance with the systems and methods of the invention.

In FIG. 2, the CMT has identified violation 203. In violation 203, a user included in user group 2 is attempting to access firewall 121. Access to firewall 121 may be a permission that is included in security group 2. The user attempting to access firewall 121 may be a user that has not been granted access to firewall 121 at least because the user group(s) that the user is included in have not be associated with security group 2.

The user attempting the violation will be referred to alternately herein as the "identified" user. The identified user may be either user 4 or user 5. This is at least because user 3 is allowed to access security group 2 as a result of his association with user group 1 in addition to user group 2.

The CMT may identify violation 203 by comparing the systems that the identified user was accessing with the systems that the identified user was authorized to access as defined by the user's inclusion in user group 2. The CMT may identify violation 203 by comparing the identified user's user transactions with the traversing rules associated with user group 2 and/or security group 4. As illustrated in FIG. 2, violation 205 was identified when the identified user executed a sequence of user transactions that was not included in the allowable sequence of transactions defined at sequence transaction 207 and sequence transaction 209.

In response to the identification of the violation, the CMT may deny the identified user access to firewall 121. The CMT may additionally or alternatively generate an electronic message reporting the attempted violation and transmit the electronic message substantially immediately to one or more predetermined addresses. The CMT may also, in some embodiments, include the attempted violation in one or more reports generated hourly, daily, bi-weekly, weekly, or monthly, for one or more managers 101.

The report prepared by the CMT may detail violations occurring during a predetermined time period. One or more of the violations may be illustrated in a pictorial representation such as the pictorial representation as set forth in FIG. 2.

In some embodiments, the CMT may be configured to correlate possible risks associated with user access and user transactions performed across servers and applications. For example, the CMT may correlate possible risks by examining transactions across multiple servers for patterns that indicate abuse or violations of access privilege. The patterns may be defined by one or more managers 101.

The CMT may also analyze data across complex transactions to provide real-time insight into risks and propose to one or more managers 101 what permissions a user should have.

For example, in some embodiments, the CMT may identify a user attempting to change access privileges of a service account and then trying to delete logs that record the subsequent crashing of a component, the crashing of a function of the component, a server entering a hung mode, and/or an application failure. The CMT may take a snapshot of all of the user's activities and the detrimental results of the activities and create one or more reports for transmission to one or more managers 101. The reports may include pictorial representations of the violations that occurred and the subsequent system failures. In some embodiments, the CMT may additionally ascertain that the user's access to the system is creating a potential threat to the stability and security of the system. The CMT may subsequently deny the user some system access or all system access. For example, the CMT may remove the user from some or all user groups which had previously included the user.

In another example, in the event that the CMT identifies a user attempting to access an unauthorized server more than three times, the CMT may propose to remove the user from all server access.

In an additional example, in the event that the CMT identifies a user group that has not used permissions granted to the user group during a predetermined time period such as a week, two weeks, one month, two months, or one year, the CMT may conclude that the user group does not need access to those permissions. The CMT may subsequently disassociate from the user group the one or more security groups that granted to the user group the unused authorized permissions. The disassociation may function to remove the unused permissions from the user group's authorized access permissions. In some embodiments, the disassociation may be automatically implemented by the CMT. In some embodiments, the disassociation may be implemented in response to a command received from one or more managers 101.

FIG. 2 additionally includes user 6. User 6 may represent a user that has not been included in either user group 1 or user group 2. In the event that user 6 attempts to access one or more of security groups 1, 2, 3 or 4, user 6's transaction may be identified as a deviation from the set point. Remedial action may be subsequently triggered.

Figure 3:
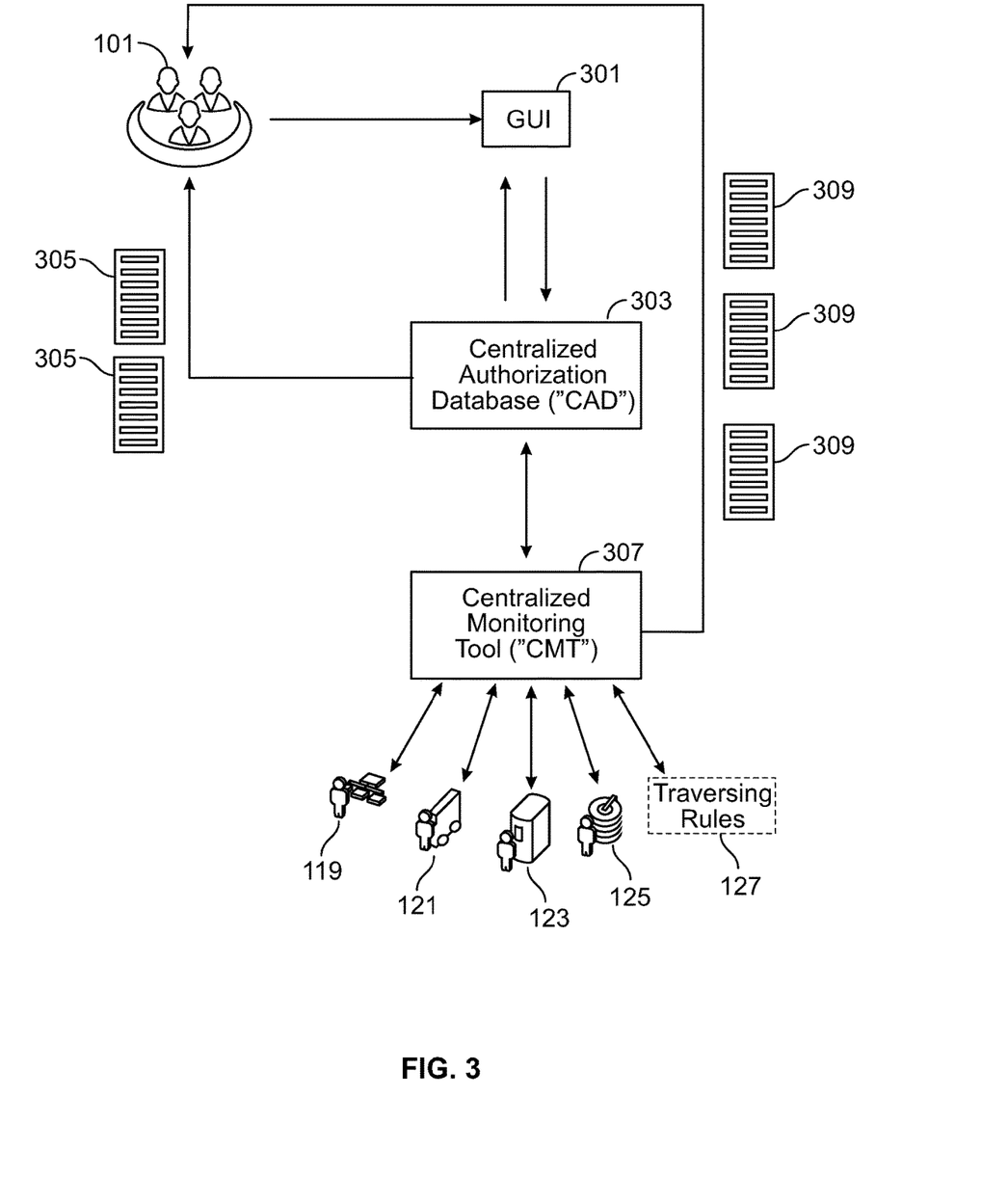
FIG. 3 shows yet another process and apparatus in accordance with the invention.

FIG. 3 illustrates additional exemplary processes and apparatus in accordance with the invention. In FIG. 3, managers 101 may access GUI 301. Managers 101 may access GUI 301 to create, edit or delete one or more user groups, security groups, users included in a user group, security groups associated with a user group, and/or traversing rules.

GUI 301 may be in electronic communication with CAD 303. CAD 303 may store data input into GUI 301. CAD 303 may define a set-point. The set point may determine the authorization permissions of a portion of business employees or all employees in a business.

CAD 303 may generate one or more reports 305. Reports 305 may be transmitted to one or more managers 101 upon the lapse of a predetermined time period or in response to a request from a manager 101. Manager 101 may use GUI 301 to create one or more customized reports including data stored in CAD 303.

CAD 303 may be in electronic communication with CMT 307. CMT 307 may request or pull data from CAD 303. For example, CMT 307 may request or pull data from CAD 303 when monitoring a user's transactions. CMT 307 may be in electronic communication with one or more of network 119, firewall 121, database 123 and/or server 125. CMT 307 may be in electronic communication with a plurality of applications, networks, firewalls, databases and/or servers (not shown).

CMT 307 may monitor user transactions of one user or a plurality of users. CMT 307 may identify user violations as described above. CMT 307 may prepare one or more reports 309. Reports 309 may be transmitted to one or more managers 101 upon the lapse of a predetermined time period or in response to a request from a manager 101. Reports 309 may be customized for each manager 101. For example, CMT 307 may prepare a weekly, bi-weekly or monthly report for each manager 101, the report detailing any violation data associated with a user overseen by manager 101.

Figure 4:
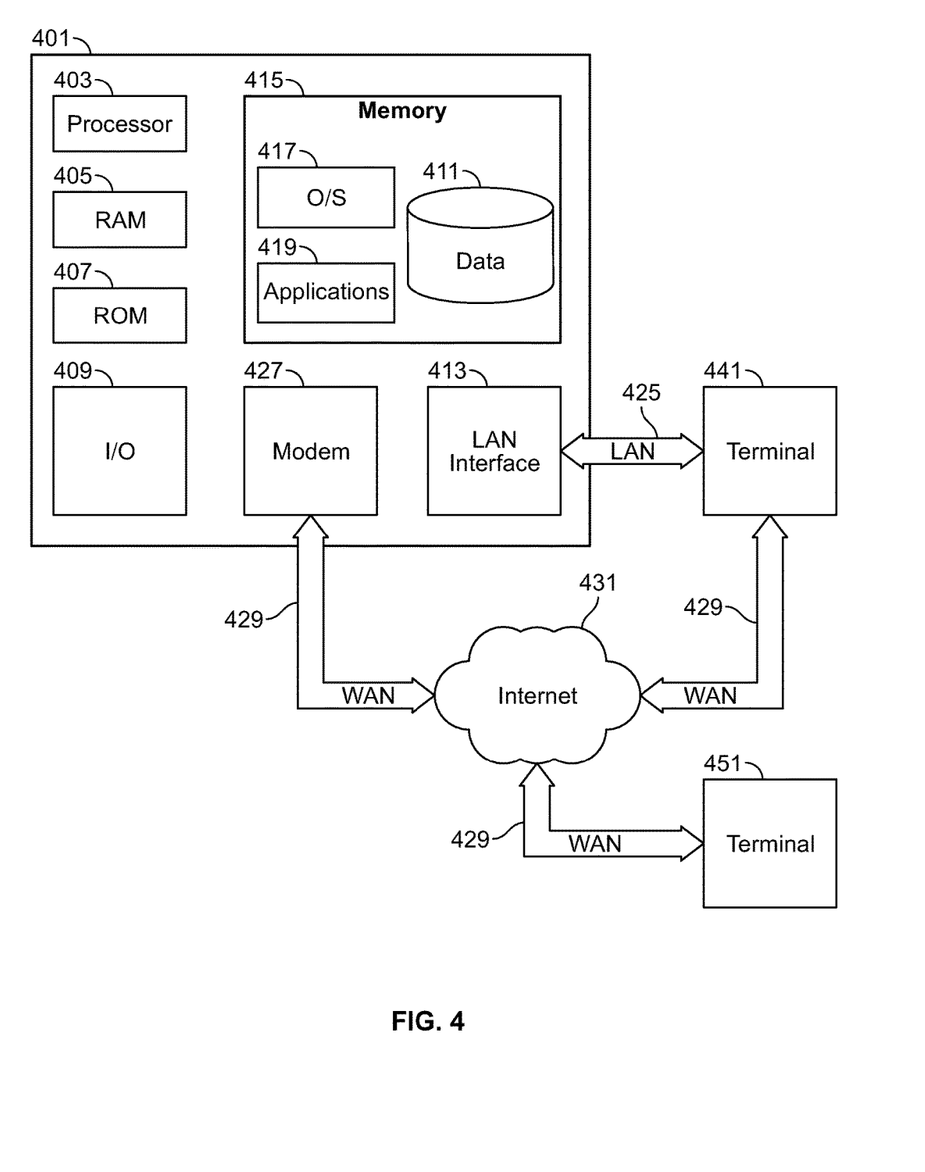
FIG. 4 shows apparatus for use with the systems and methods in accordance with the invention.

FIG. 4 is a block diagram that illustrates computing device 401 (alternately referred to herein as a "server") that may be used to execute one or more processes and methods in accordance with illustrative embodiments of the invention. The computer server 401 may have a processor 403 for controlling overall operation of the server and its associated components, including RAM 405, ROM 407, input/output module 409, and memory 415.

Input/output ("I/O") module 409 may include a microphone, keypad, touch screen, and/or stylus through which a user of server 401 may provide input, and may also include one or more of a speaker for providing audio output and a video display device for providing textual, audiovisual and/or graphical output. Software may be stored within memory 415 and/or storage to provide instructions to processor 404 for enabling server 401 to perform various functions. For example, memory 415 may store software used by server 401, such as an operating system 417, application programs 419, and an associated database 411. Alternatively, some or all of server 401 computer executable instructions may be embodied in hardware or firmware (not shown). Database 411 may provide storage for the GUI. Database 411 may provide storage for the CAD. For example, database 411 may store information input into the GUI. Database 411 may provide storage for the CMT while the CMT is monitoring and recording user transactions.

Server 401 may operate in a networked environment supporting connections to one or more remote computers, such as terminals 441 and 451. Terminals 441 and 451 may be personal computers or servers that include many or all of the elements described above relative to server 401. The network connections depicted in FIG. 4 include a local area network (LAN) 425 and a wide area network (WAN) 429, but may also include other networks. When used in a LAN networking environment, computer 401 is connected to LAN 425 through a network interface or adapter 413. When used in a WAN networking environment, server 401 may include a modem 427 or other means for establishing communications over WAN 429, such as Internet 431. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages or screens via the World Wide Web from a web-based server. Any of various conventional web browsers can be used to display and manipulate data on web pages.

Additionally, application program 419, which may be used by server 401, may include computer executable instructions for invoking user functionality related to communication, such as email, short message service (SMS), and voice input and speech recognition applications.

Computing device 401 and/or terminals 441 or 451 may also be mobile terminals including various other components, such as a battery, speaker, and antennas (not shown).

A terminal such as 441 or 451 may be used by a user of the GUI to access and input information into the GUI, including information for creating one or more user groups, security groups, traversing rules, associating one or more user groups with one or more security groups and/or associating one or more traversing rules with one or more user groups, security groups or users. Information input into the GUI may be stored in memory 415. The input information may be processed by an application such as one of applications 419.

Figure 5:
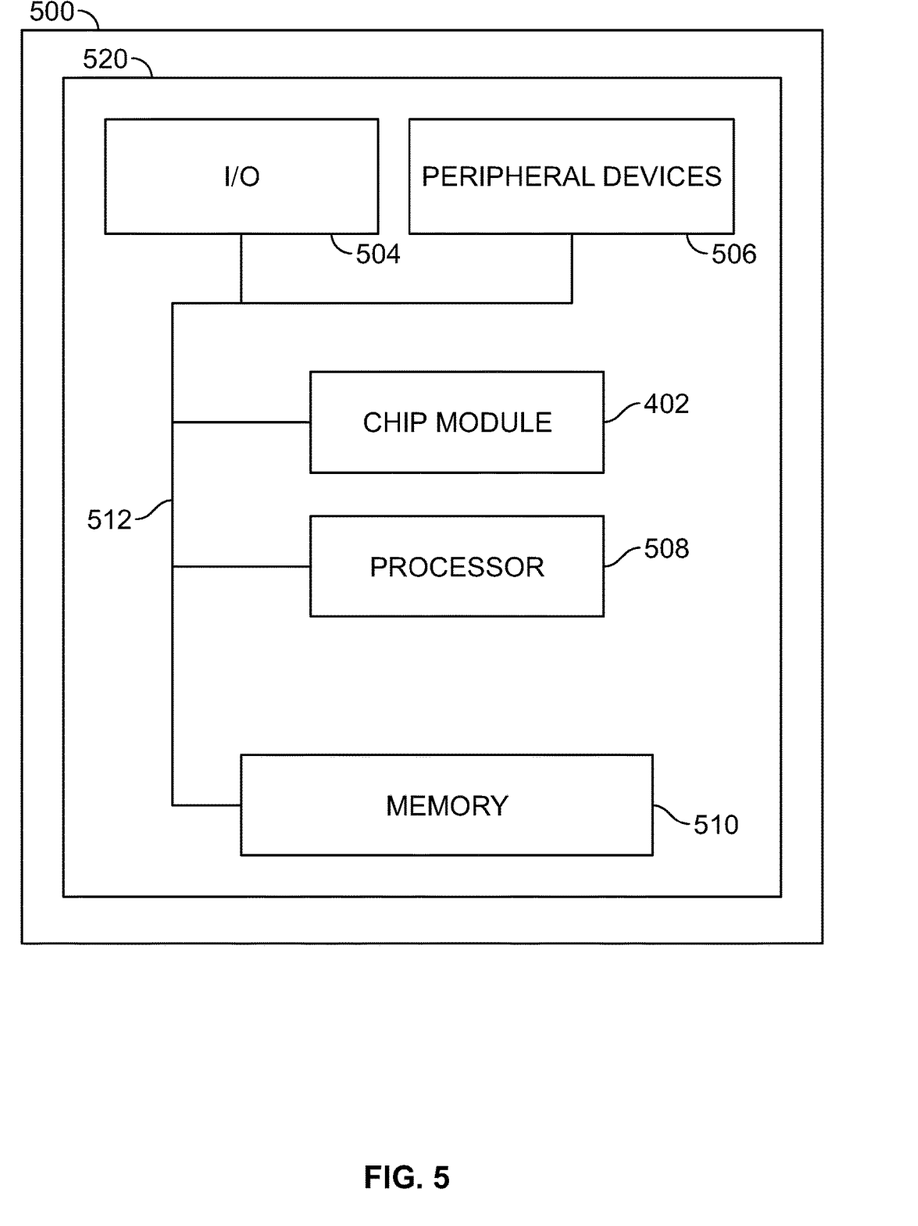
FIG. 5 shows additional apparatus for use with the systems and methods in accordance with the invention.

FIG. 5 shows an illustrative apparatus that may be configured in accordance with the principles of the invention.

FIG. 5 shows illustrative apparatus 500. Apparatus 500 may be a computing machine. Apparatus 500 may be included in apparatus shown in FIG. 4. Apparatus 500 may include chip module 502, which may include one or more integrated circuits, and which may include logic configured to perform any other suitable logical operations.

Apparatus 500 may include one or more of the following components: I/O circuitry 504, which may include the transmitter device and the receiver device and may interface with fiber optic cable, coaxial cable, telephone lines, wireless devices, PHY layer hardware, a keypad/display control device or any other suitable encoded media or devices; peripheral devices 506, which may include counter timers, real-time timers, power-on reset generators or any other suitable peripheral devices; logical processing device ("processor") 508, which may compute data structural information, structural parameters of the data, quantify indicies; and machine-readable memory 510.

Machine-readable memory 510 may be configured to store information in machine-readable data structures information such as user groups, security groups, traversing rules, associations between user groups and security groups, associations between one or more traversing rules and one or more user groups, security groups and/or users, and any other suitable information or data structures.

Components 502, 504, 506, 508 and 510 may be coupled together by a system bus or other interconnections 512 and may be present on one or more circuit boards such as 520. In some embodiments, the components may be integrated into a single silicon-based chip.

It will be appreciated that software components including programs and data may, if desired, be implemented in ROM (read only memory) form, including CD-ROMs, EPROMs and EEPROMs, or may be stored in any other suitable computer-readable medium such as but not limited to discs of various kinds, cards of various kinds and RAMs. Components described herein as software may, alternatively and/or additionally, be implemented wholly or partly in hardware, if desired, using conventional techniques.

Various signals representing information described herein may be transferred between a source and a destination in the form of electromagnetic waves traveling through signal-conducting encoded media such as metal wires, optical fibers, and/or wireless transmission encoded media (e.g., air and/or space).

Apparatus 500 may operate in a networked environment supporting connections to one or more remote computers via a local area network (LAN), a wide area network (WAN), or other suitable networks. When used in a LAN networking environment, apparatus 500 may be connected to the LAN through a network interface or adapter in I/O circuitry 504. When used in a WAN networking environment, apparatus 500 may include a modem or other means for establishing communications over the WAN. It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to operate processor 508, for example over the Internet.

Apparatus 500 may be included in numerous general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, tablets, programmable consumer electronics, network PCs, minicomputers, mainframe computers, distributed computing environments that include any of the above systems or devices, and the like.

Thus, systems and methods for an enhanced electronic monitoring solution have been provided. Persons skilled in the art will appreciate that the present invention can be practiced by other than the described embodiments, which are presented for purposes of illustration rather than of limitation.

What is claimed is:

1. One or more non-transitory computer-readable media storing computer-executable instructions which, when executed by a processor on a computer system, perform a method for enhancing computer security, the method comprising:

storing in a database a first group of users associated with a first user group and a second group of users associated with a second user group;

storing in the database a first security group, a second security group, a first plurality of permissions associated with the first security group and a second plurality of permissions associated with the second security group, wherein the first plurality of permissions include authorized access to a physical layer of a first server and the second plurality of permissions include authorized access to an application layer of a second server;

storing in the database a first set of data associating the first group of users with the first security group and a second set or data associating the second group of users with the second security group;

storing in the database a first set of traversing rules associated with the first security group and a second set of traversing rules associated with the second security group, each of the sets of traversing rules including a plurality of user commands;

continuously comparing commands executed by each of the users included in the first group of users to the first set of traversing rules, and continuously comparing commands executed by each of the users included in the second group of users to the second set of traversing rules;

generating an electronic notification in response to identifying a command executed by a first user included in the first group of users that is not included in the first set of traversing rules; and if a response to the notification is not received within a predetermined length of time, automatically suspending the first user's access to the physical layer of the first server.

2. The media of claim 1 wherein, in the method, the first plurality of permissions further includes permissions to access a physical layer of an application.

3. The media of claim 2 wherein, in the method, the second plurality of permissions further includes permissions to access a firewall.

4. The media of claim 1 wherein, in the method, a second user is associated with both the first user group and the second user group.

5. The media of claim 4 wherein, in the method, the commands executed by the second user are continuously compared to both the first set of traversing rules and the second set of traversing rules.

6. The media of claim 1 wherein, in the method, the storing further comprises storing in the database a third set of data associating the second group of users with the first security group, wherein the commands executed by each of the users included in the second group of users are compared to both the first set of traversing rules and the second set of traversing rules.

7. The media of claim 1 wherein, in the method, the command executed by the first user is a command attempting to access the application layer of the second server.

8. The media of claim 1 wherein, in the method, the electronic notification is transmitted to a manager of the first user group.

9. The media of claim 8 wherein, in the method, the predetermined length of time is based at least in part on at least one of a geographic location of the manager, a historical response time of the manager, and a number of employees that the manager is responsible for overseeing.

* * * * *